US008659616B2

(12) United States Patent
Enderton

(10) Patent No.: US 8,659,616 B2
(45) Date of Patent: Feb. 25, 2014

(54) SYSTEM, METHOD, AND COMPUTER PROGRAM PRODUCT FOR RENDERING PIXELS WITH AT LEAST ONE SEMI-TRANSPARENT SURFACE

(75) Inventor: Eric B. Enderton, Berkeley, CA (US)

(73) Assignee: NVIDIA Corporation, Santa Clara, CA (US)

( * ) Notice: Subject to any disclaimer, the term of this patent is extended or adjusted under 35 U.S.C. 154(b) by 1044 days.

(21) Appl. No.: 12/708,443

(22) Filed: Feb. 18, 2010

(65) Prior Publication Data

US 2011/0199385 A1   Aug. 18, 2011

(51) Int. Cl.
*G09G 5/02* (2006.01)

(52) U.S. Cl.
USPC ........................................................ 345/592

(58) Field of Classification Search
None
See application file for complete search history.

(56) References Cited

U.S. PATENT DOCUMENTS

| | | | |
|---|---|---|---|
| 6,603,451 B1 * | 8/2003 | Mergler et al. | 345/87 |
| 7,333,119 B1 * | 2/2008 | King et al. | 345/611 |
| 7,636,471 B2 | 12/2009 | Strom et al. | |
| 2004/0233195 A1 * | 11/2004 | Bunnell | 345/426 |
| 2007/0070082 A1 | 3/2007 | Brennan | |
| 2007/0140554 A1 | 6/2007 | Strom et al. | |
| 2008/0143731 A1 * | 6/2008 | Cheng et al. | 345/502 |
| 2010/0188416 A1 * | 7/2010 | Hayes | 345/592 |

FOREIGN PATENT DOCUMENTS

| | | |
|---|---|---|
| CN | 1898699 A | 1/2007 |
| CN | 101055645 A | 10/2007 |
| CN | 101136108 A | 3/2008 |
| WO | 2008130992 A1 | 10/2008 |

OTHER PUBLICATIONS

Office Action from German Patent Application No. 10 2011 011 641.9, dated Jun. 20, 2012.
Balci et al., "ARB Sample Shading," Jan. 20, 2010, revision 7, pp. 1-6, retrieved from http://www.opengl.org/registry/specs/ARB/sample_shading.txt on Feb. 18, 2010.
Bavoil et al., "Order Independent Transparency with Dual Depth Peeling," Feb. 9, 2008, pp. 1-12, NVIDIA Corporation, Santa Clara, CA.
Bavoil et al., "Multi-Fragment Effects on the GPU Using the k-Buffer," 2007, pp. 97-104, Proceedings of the 2007 Symposium on Interactive 3D Graphics and Games.
Callahan et al., "Interactive Rendering of Large Unstructured Grids Using Dynamic Level-of-Detail," Oct. 23-28, 2005, pp. 1-8, 16th IEEE Visualization.
Carpenter, "The A-Buffer, an Antialiased Hidden Surface Method," Jul. 1984, pp. 103-108, vol. 18, No. 3, ACM Computer Graphics.
Eisemann et al., "Fast Scene Voxelization and Applications," Mar. 14-17, 2006, pp. 71-78, ACM Associate for Computing Machinery Inc., Redwood City, CA.

(Continued)

*Primary Examiner* — Carlos Perromat
(74) *Attorney, Agent, or Firm* — Zilka-Kotab, PC

(57) ABSTRACT

A system, method, and computer program product are provided for rendering pixels with multiple semi-transparent surfaces. In use, a pixel is identified. Additionally, an operation to generate a plurality of samples for the pixel is performed. Further, a subset of the samples for each of at least one semi-transparent surface associated with the pixel is selected at least in part in a random manner. Moreover, the pixel is rendered utilizing the selected subset of the samples for each of the at least one semi-transparent surface.

11 Claims, 8 Drawing Sheets

(56) References Cited

OTHER PUBLICATIONS

Everitt, "Interactive Order-Independent Transparency," Engineering, CiteSeer, 2001, pp. 1-11, vol. 2, Issue 6.

Fuchs et al., "Fast Spheres, Shadows, Textures, Transparencies, and Image Enhancements in Pixel-Planes", Jul. 22-26, 1985, pp. 111-120, vol. 19, No. 3, ACM SIGGRAPH Computer Graphics, ACM, San Francisco, CA.

Kircher et al., "Inferred Lighting: Fast Dynamic Lighting and Shadows for Opaque and Translucent Objects," 2009, pp. 1-6, ACM, Proceedings of the 2009 ACM SIGGRAPH Symposium on Video Games, New York, NY.

Liu et al., "Multi-Layer Depth Peeling via Fragment Sort," Jun. 2006, pp. 1-4, TechReport, Microsoft Research.

Liu et al., "Bucket Depth Peeling," Aug. 3-7 2009, p. 1, ACM, SIGGRAPH 2009, New Orleans, Louisiana.

Lokovic et al., "Deep Shadow Maps," Aug. 2000, pp. 385-392, ACM, Proceedings of SIGGRAPH 2000.

Morley et al., "Image Synthesis Using Adjoint Photons," 2006, pp. 1-8, GI '06 Proceedings of Graphics Interface 2006, Canadian Information Processing Society, Toronto, Ontario, Canada.

Mulder et al., "Pixel Masks for Screen-Door Transparency," 1998, pp. 1-8, VIS '98 Proceedings of the Conference on Vizualization '98, IEEE Computer Society Press, Los Alamitos, CA.

Neider et al., "OpenGL Programming Guide: The Official Guide to Learning Open GL, Release 1", 1993, pp. 1-516, Addison-Wesley Publishing Company, USA and Canada.

Sen et al., "Silhouette-Opaque Transparency Rendering," Aug. 13-15, 2003, pp. 153-158, Proceedings of the 6th IASTED International Conference on Computer Graphics and Imaging, Honolulu, HI, USA.

Sintorn et al., "Real-Time Approximate Sorting for Self Shadowing and Transparency in Hair Rendering," 2008, pp. 1-6, I3D '08 Proceedings of the 2008 Symposium on Interactive 3D Graphics and Games, ACM, New York, NY.

Sintorn et al., "Hair self shadowing and transparency depth ordering using occupancy maps," 2009, pp. 1-8, I3D '09 Proceedings of the 2009 Symposium on Interactive 3D Graphics and Games, ACM, New York, NY.

Yuksel et al., "Deep Opacity Maps," 2008, pp. 675-680, vol. 27, No. 2, EUROGRAPHICS 2008, The Eurographics Association and Blackwell Publishing Ltd., UK and USA.

Office Action from Chinese Patent Application No. 201110040631.2, dated Jan. 21, 2013.

Office Action from Chinese Patent Application No. 201110040631.2, dated Sep. 26, 2013.

* cited by examiner

600

0.5  * 0.6/0.5  = 0.6

0.5  * 0.6/0.5  = 0.6

0.75 * 0.6/0.75 = 0.6

0.5  * 0.6/0.5  = 0.6

0.75 * 0.6/0.75 = 0.6

SYSTEM, METHOD, AND COMPUTER PROGRAM PRODUCT FOR RENDERING PIXELS WITH AT LEAST ONE SEMI-TRANSPARENT SURFACE

FIELD OF THE INVENTION

The present invention relates to rendering pixels, and more particularly to rendering pixels associated with semi-transparent surfaces.

BACKGROUND

In many situations, a pixel of an image may be rendered utilizing multiple surfaces that are at least partially transparent. For example, each pixel representative of hair, foliage, smoke, etc. may be rendered utilizing multiple surfaces that are at least partially transparent. Unfortunately, traditional techniques for rendered pixels associated with multiple semi-transparent surfaces have exhibited various limitations.

For example, such traditional techniques have generally required the semi-transparent surfaces associated with a pixel to be sorted prior to rendering the pixel. While sorting at the object level has conventionally resulted in unwanted artifacts when objects overlap in depth, sorting the various semi-transparent surfaces of a pixel has been computationally expensive. There is thus a need for addressing these and/or other issues associated with the prior art.

SUMMARY

A system, method, and computer program product are provided for rendering pixels with multiple semi-transparent surfaces. In use, a pixel is identified. Additionally, an operation to generate a plurality of samples for the pixel is performed. Further, a subset of the samples for each of at least one semi-transparent surface associated with the pixel is selected at least in part in a random manner. Moreover, the pixel is rendered utilizing the selected subset of the samples for each of the at least one semi-transparent surface.

DETAILED DESCRIPTION

Figure 1:
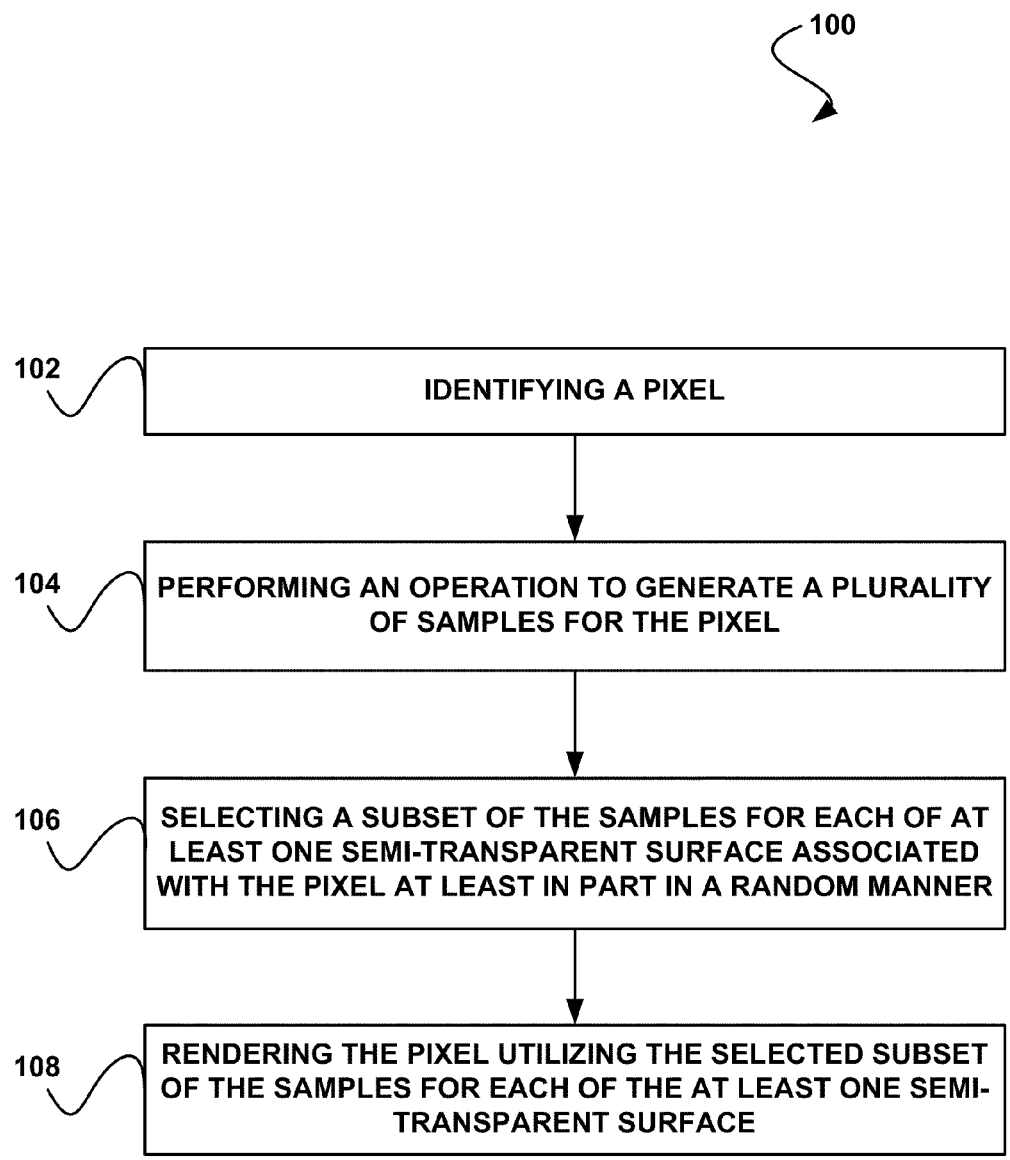
FIG. 1 shows a method for rendering pixels with multiple semi-transparent surfaces, in accordance with one embodiment.

FIG. 1 shows a method for rendering pixels with multiple semi-transparent surfaces, in accordance with one embodiment. As shown in operation 102, a pixel is identified. With respect to the present description, the pixel includes any subpart of an image that is capable of being rendered and that is associated with at least one (e.g. overlapping) semi-transparent surface. For example, the pixel may include one of a plurality of subparts representing the image as a combination of color values (i.e. red, green, and blue color values).

In various embodiments, the image represented at least in part by the pixel may include hair, foliage, smoke, a shadow, a window, semi-transparent cloth, etc. For example, the semi-transparent surfaces associated with the pixel may be combined to form the subpart of the image represented by the pixel. Of course, however, the image may include any image for which at least a portion is generated utilizing at least one semi-transparent surface. To this end, the pixel may optionally be identified based on its association with the semi-transparent surface(s), for performing the operations described below to render the pixel, such that for each surface identified by a graphics processor (e.g. GPU), a pixel associated therewith may be identified for rendering, as described below. In this way, the method 100 may be performed for each of a plurality of pixels of an image that are associated with at least one semi-transparent surface.

Additionally, as shown in operation 104, an operation is performed to generate a plurality of samples for the pixel. With respect to the present description, the samples may each represent a different point or region within or nearby the pixel. For example, at least one region (e.g. line, point, area, etc.) may be generated for the pixel, and a plurality of samples may be generated for each region. Accordingly, each sample may include information associated with the represented point or region of the pixel, such as a color value (red, green, and blue color values) and a depth (z) value. As another option, a portion of the samples may only refer to values of another sample (e.g. where the operation includes coverage-sample anti-aliasing). For display of the image, the colors of the samples may be combined to determine the color of the pixel (e.g. by an average or weighted average).

In one embodiment, each sample may be covered by (intersected by) zero or more of the aforementioned semi-transparent surfaces. Thus, the color value and the z-value for the sample may be determined from the front-most semi-transparent surface that covers it (i.e. as determined by the z-value of each of the semi-transparent surfaces). Just by way of example, each sample may be a z-buffer sample which performs z-buffer comparisons, such that it retains the nearest z-value. This can be implemented as z-buffer hardware (e.g. for efficiency), emulated using hardware blending with a "minimum" function, or emulated in software.

It should be noted that with respect to the present description, the semi-transparent surfaces associated with the pixel may each be a fragment of a different primitive contained in at least a portion of the pixel, such that the pixel may represent a combination of the semi-transparent surfaces. For example, the surface may include a computer-modeled surface, a line, a point, a volume, etc. Furthermore, the semi-transparent surfaces may include any levels of transparency (and the reciprocal levels of opacity). Just by way of example, where alpha ($\alpha$) represents the level of opacity of a surface, $\alpha=0$ may indicate that the surface is completely transparent, whereas $\alpha=1$ may indicate that the surface is completely opaque, and thus any value in between may indicate the intermediate level of opacity of the surface. A semi-transparent surface may cover a subset (R) of the samples (S) generated for the pixel, such that the level of opacity ($\alpha$) for the semi-transparent surface may be equal to R/S. Additionally, for a particular semi-transparent surface that is not in front, its proportion of contribution to the final pixel may be the product of its own level of opacity ($\alpha$) and ($1-\alpha_i$) for all other semi-transparent surfaces (i) in front of the particular semi-transparent surface.

Optionally, a number of the samples generated for the pixel may be predefined. For example, the number of the samples generated for the pixel may be 4, 8, or any other desired number. As another option, the number of samples generated for a pixel may be increased if the pixel is determined to have large variance. It should be noted that greater accuracy of the representation of the image may be provided by the pixel when more samples are generated. Of course, this must be weighed in view of a cost of the calculations to generate the samples and process the samples in the manner described in the operations below.

In one embodiment, the operation performed to generate the samples for the pixel may include multi-sample anti-aliasing, in which each sample is generated from the pixel. Thus, a plurality of samples may be directly generated from various points on the pixel. In another embodiment, the operation performed to generate the samples for each of the semi-transparent surfaces may include super-sample anti-aliasing, in which a plurality of pixels is generated for the identified pixel (e.g. by increasing the resolution of the image) and a sample (e.g. a single sample) is generated for each of the plurality of pixels generated for the identified pixel. Optionally, the operation performed to generate the samples for the pixel may include a combination of the multi-sample anti-aliasing and the super-sample anti-aliasing.

In another embodiment, the operation performed to generate the samples for the pixel may include multi-pass sampling where one sample per pixel is generated at a time over multiple passes. For example, the same pixel may be rendered several times (as described below with respect to operation 108), and the results averaged together. It should be noted that the aforementioned multi-sample anti-aliasing, super-sample anti-aliasing, and multi-pass may be utilized in combination, such that the total number of samples generated for the pixel is equal to the multi-sampling rate multiplied by the super-sampling rate multiplied by the number of passes of the multi-pass.

Figure 2:
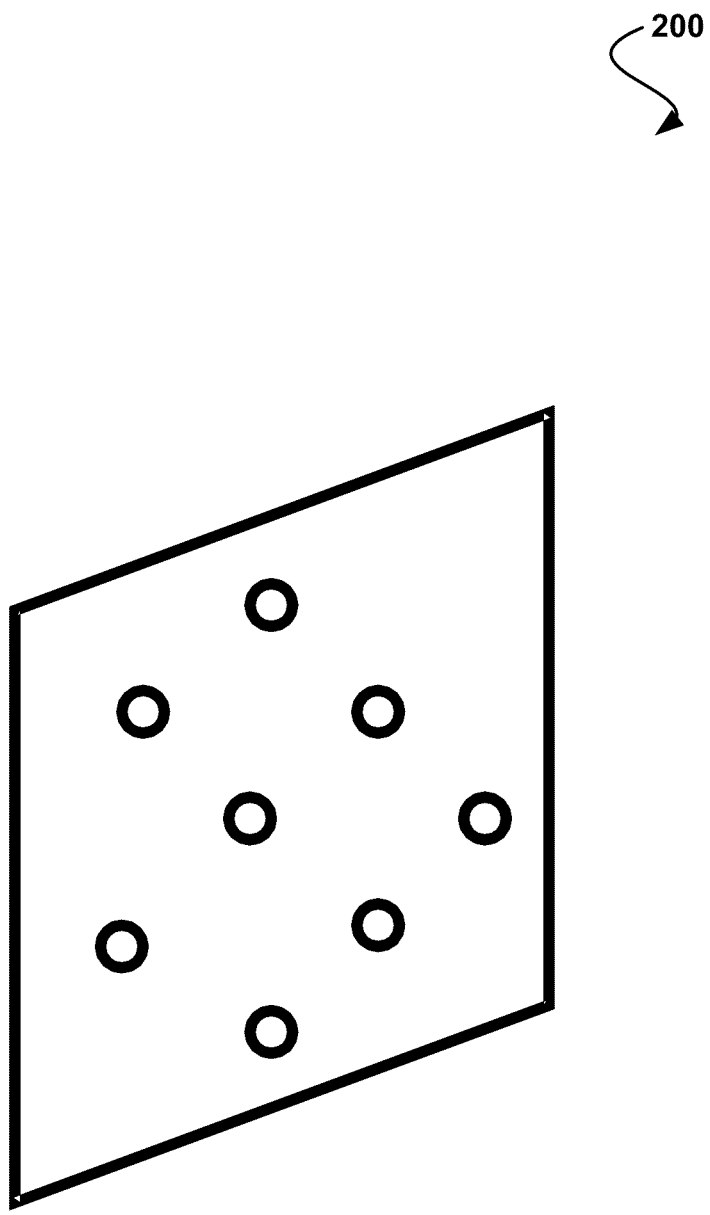
FIG. 2 shows a plurality of samples generated for a pixel, in accordance with another embodiment.

In yet other embodiments, the operation performed to generate the samples for the pixel may include sampling an edge of the pixel, borrowing samples from a neighboring pixel, sampling lines across the pixel, etc. While various embodiments of the operation to generate the samples for the pixel have been described above, it should be noted that the operation may include any operation (e.g. function, etc.) in which multiple samples are generated for (e.g. identified, retrieved, etc. from) the pixel. FIG. 2 illustrates one example of a pixel in which multiple samples have been generated (e.g. utilizing any of the aforementioned techniques), in accordance with another embodiment.

Further, as shown in operation 106, a subset of the samples is selected for each of a plurality of semi-transparent surfaces associated with the pixel at least in part in a random manner. With respect to the present description, the subset of the samples for each of the semi-transparent surfaces may include only a portion (e.g. zero or more) of the samples generated for the pixel. In other words, for each of the semi-transparent surfaces, a portion of the samples generated for the pixel may be selected as the subset. In one embodiment, the subset of the samples selected for each of the semi-transparent surfaces may optionally only include samples covered by the semi-transparent surface.

Figure 3:
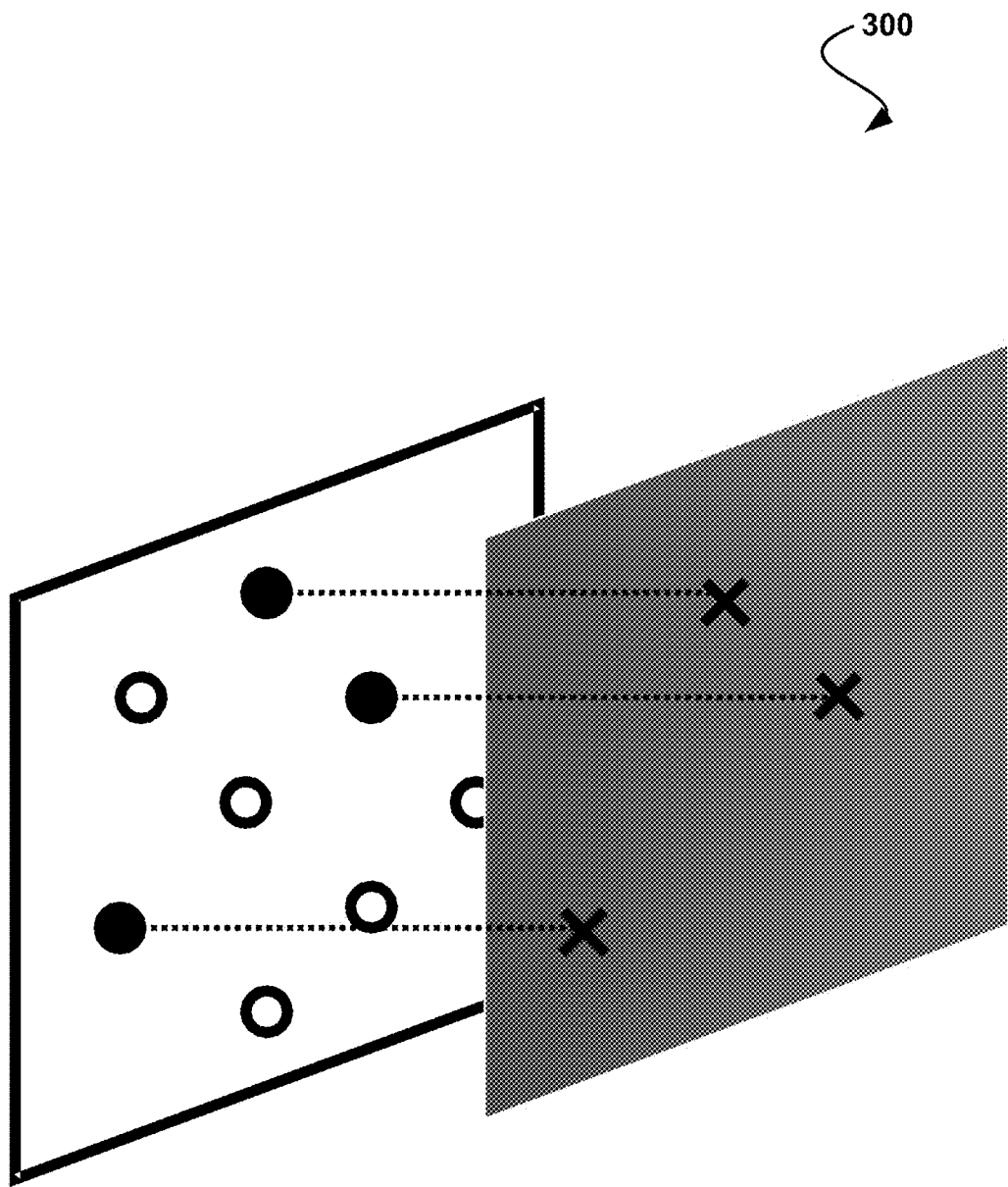
FIG. 3 shows a selection of a subset of samples for a semi-transparent surface, in accordance with yet another embodiment.

To this end, the samples selected as the subset for each of the semi-transparent surfaces may be different points on the semi-transparent surface (e.g. which each correlate with a point on the pixel). Accordingly, information associated with the point on the semi-transparent surface represented by a sample in the subset associated with the semi-transparent surface may be stored, such as a color value (red, green, and blue color values) and a depth value of the represented point on the semi-transparent surface. FIG. 3 illustrates one example of a selection of a subset of samples for a semi-transparent surface, in accordance with another embodiment.

In one embodiment, the subset may be determined by deciding for each sample whether it is included or excluded from the subset, using alpha as the probability. To this end, a number of the samples included in each subset may be a function of (e.g. in proportion to) an opacity value of the semi-transparent surface. Just by way of example, as noted above where alpha ($\alpha$) represents the level of opacity of a surface, the number of the samples included in a subset for a particular semi-transparent surface may be determined by multiplying $\alpha$ by the number of samples generated for the pixel. Table 1 shows one example of an equation for determining the number of samples forming a subset for a particular semi-transparent surface. It should be noted that the equation shown in Table 1 is set forth for illustrative purposes only and thus should not be construed as limiting in any manner.

TABLE 1

//where S = the number of samples generated for the pixel,
Number of generated samples selected as subset for semi-transparent surface = $\alpha_{semi-transparent\ surface} * S$ In another embodiment, a number of the samples included in each subset may be selected utilizing stratified sampling in which the number of the samples is randomly selected between a plurality of numbers that are dependent on alpha (e.g. in which a number of the samples in the subset is determined first, and that number of samples are subsequently selected, for avoiding independent pseudo-random decisions being made for each sample). For example, for surfaces with a same alpha in which a number of samples cannot be evenly determined based on alpha (e.g. where alpha falls between the alphas one can get with 4/8 samples, 5/8 samples, etc.), the number of samples in the subsets for each of such samples may be randomly selected from one of the even alphas (e.g. 4/8, 5/8) closest to the actual alpha for the surfaces. Thus, for at least a portion of the semi-transparent surfaces associated with the pixel for which the alphas are the same, a different number of samples may be included between the subsets. In other words, a first subset of samples selected for a first one of the semi-transparent surfaces with a first alpha may be of a different number of samples than a second subset of samples selected for a second one of the semi-transparent surfaces with the first alpha.

Optionally, the numbers from which the number of the samples for a subset is randomly selected may be generated as a function of an opacity value, a number of the generated samples, and a pseudorandom number. Table 2 illustrates one example of an equation for determining the predetermined numbers from which the number of the samples included in each subset may be selected. Again, it should be noted that the equation shown in Table 2 is set forth for illustrative purposes only and thus should not be construed as limiting in any manner.

TABLE 2

```
//where α is the opacity level for a semi-transparent surface,
//S is the number of samples generated for the pixel,
//R is the number of the samples that may be included in the subset for the
semi-transparent surface,
// ξ is a canonical random number (uniform in [0, 1), and
//i is the semi-transparent surface
```
$$R_i = \lfloor (\alpha_i * S) + \xi \rfloor$$

In one example implementation of the equation shown in Table 2, if S=4 and $\alpha_0$=0.45, then there will be a 20% chance of using $R_0$=1 and an 80% chance of using $R_0$=2. As another option, R could be dithered across a tile, for further stratification. A random subset of R samples is then selected. This may allow the error for one fragment to decrease more rapidly with the number of samples, thus avoiding diminishing returns. For example, it may ensure the set size of the subset is within one of the ideal non-integer set size.

Of course, while various embodiments of determining the number of the samples included in each subset have been described above, it should be noted that such number of the samples included in each subset may be determined in any desired manner.

Figure 4:
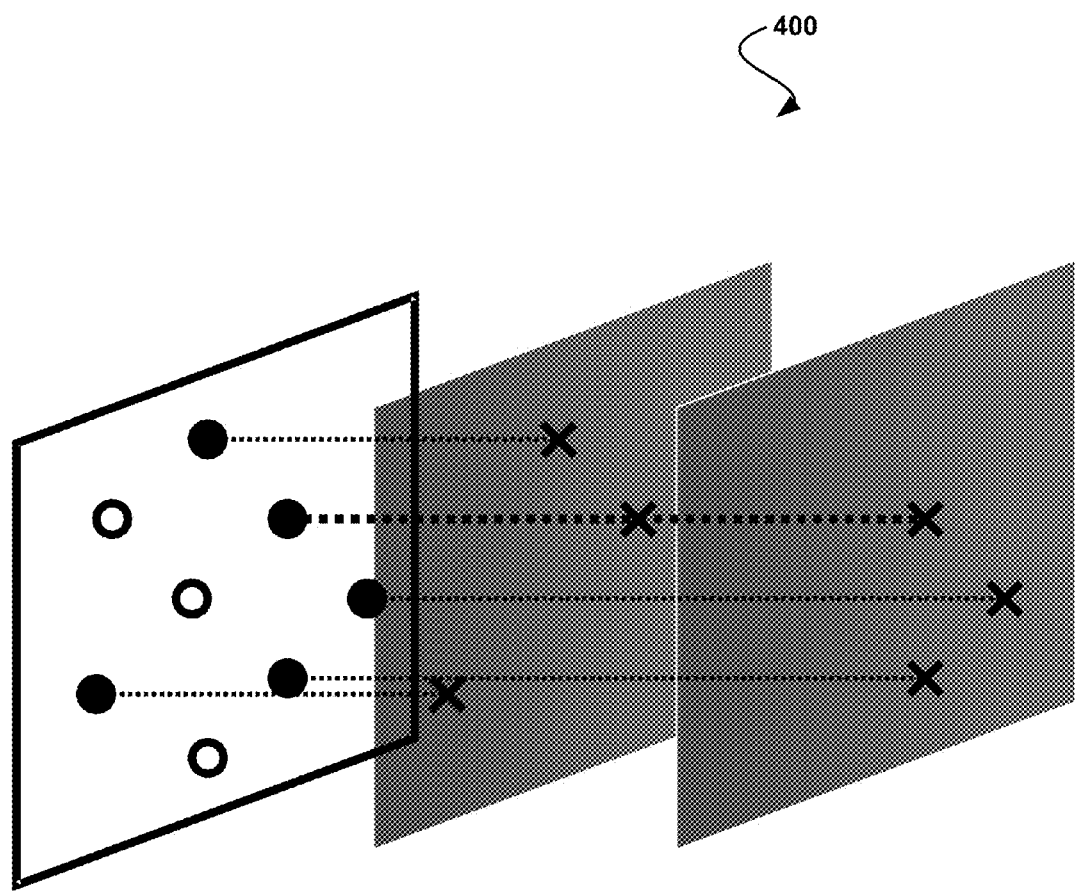
FIG. 4 shows a selection of a subset of samples for each of a plurality of semi-transparent surfaces associated with a pixel that is performed randomly at least in part, in accordance with still yet another embodiment.

As also noted above, the subset of the samples for each of the semi-transparent surfaces is selected at least in part in a random manner. With respect to the present description, random may include varied, pseudo-random, and/or any other technique whereby a single sample generated from the pixel may or may not be included in each of the subsets selected for each of the semi-transparent surfaces. By selecting the subset of samples at least in part in the random manner, the subsets within the pixel may be "uncorrelated" (i.e. random with respect to each other). FIG. 4 shows an example of a selection of a subset of samples for each of a plurality of semi-transparent surfaces associated with a pixel that is performed randomly at least in part, in accordance with still yet another embodiment.

In one embodiment, the subset of the samples for each of the semi-transparent surfaces may be selected in a pseudo-random manner. In another embodiment, a plurality of possible subsets of the samples for a semi-transparent surface may be determined, where each of the possible subsets includes a different combination (e.g. a different possible combination) of a portion of the samples generated for pixel. Optionally, for each of the possible subsets the portion of the samples included therein may comprise a low discrepancy random pattern, such that the portion of the samples generated for the pixel included in each of the possible subsets are distributed across the pixel and thus across the semi-transparent surface. Further, the subset of the samples for the semi-transparent surface may be selected by selecting one of the determined subsets described above.

In yet another embodiment, the subset of the samples for each of the semi-transparent surfaces may be selected utilizing a table. Optionally, the table may be predefined to contain a plurality of different subsets, each including different possible points on a pixel. As another option, the possible points included in each of the subsets may include a low discrepancy random pattern, such that they are distributed across the pixel. Thus, a table containing a plurality of possible subsets of the samples for any semi-transparent surface may be determined in advance, where each of the possible subsets includes a different combination of a portion of the samples generated for the pixel, and for each of the semi-transparent surfaces, one of the possible subsets may be selected from the table.

For example, for a first subset of samples selected for a first semi-transparent surface, a first one of the predefined subsets may be selected from the table, such that the points included therein may be utilized as the first subset of samples. As another example, for a second subset of samples selected for a second semi-transparent surface, a second one of the predefined subsets may be selected from the table, such that the points included therein may be utilized as the second subset of samples, and so forth.

As another option, the table may be predefined to contain a plurality of possible permutations (orderings) of the samples generated for a pixel. Thus, for each of the semi-transparent surfaces, one of the possible permutations may be selected from the table, and a region of the permutation containing the desired number of samples for the subset may be selected.

In one exemplary embodiment, the subset of the samples for each of the semi-transparent surfaces may be selected at least in part in a random manner based on a predetermination of three decision points (which may be used consistently for the rendering of all pixels associated with at least one semi-transparent surface). First, it may be determined whether a thermometer is to be utilized. If a thermometer is utilized, samples are added one at a time as the opacity level goes up from 0 to 1. To select a thermometer, a permutation (ordering) of the samples is selected. If a thermometer is not to be utilized a completely different subset of samples may be selected for different opacity levels.

Second, it may be determined whether a fixed table (e.g. stored in memory or stored as logic gates) or a computation (e.g. a "hash function") is to be utilized. Third, the manner in which the starting value is identified may be determined. For the fixed table, the starting value may be the index into the table. For the computation, the starting value may be the input, and with the same input the same output may always be provided.

As an option, the starting value for each semi-transparent surface associated with the pixel may be the different, while preventing the starting value from change every frame (when things move) in order to avoid shifting of the noise pattern every frame. For example, the starting value may optionally be any combination of the following shown in Table 5.

TABLE 5

1) the pixel's x, y address in the screen
2) the sample number within the pixel
3) the depth value (z)
4) the "primitive ID" (e.g. a number assigned to each triangle or other primitive), which may make the noise more stable from frame to frame when objects move. For example, the selected subset for a semi-transparent surface may be a function of an automatically generated number (primitive ID) associated with the semi-transparent surface.
5) an "object ID" (e.g. a number assigned by the user, such as the game engine programmer, to each "object" which might be a tree or a character, a tree limb or a character's arm), which may make the noise more stable from frame to frame when objects move. For example, the selected subset for a semi-transparent TABLE 5-continued surface may be a function of a user-supplied number associated with the semi-transparent surface.
6) an extra bit that states whether the primitive is forward-facing or backwards-facing (e.g. which may be useful when both the front and back of an object are transparent)
7) a value determined by the shader (e.g. the hardware may not necessarily require use of a particular value as the starting value, but instead it may let the programmer write a program to determine the starting value, and this becomes part of the "shader" that's executed for each semi-transparent surface such that the programmer can pick from the list above, or come up with their own idea).

Moreover, as shown in operation 108, the pixel is rendered utilizing the selected subset of the samples for each of the semi-transparent surfaces. With respect to the present embodiment, the pixel may be rendered in any manner that generates the portion of the image represented by the pixel utilizing the selected subset of the samples for each of the semi-transparent surfaces. For example, the pixel may be rendered utilizing a graphics processor. Furthermore, the multiple semi-transparent surfaces affecting a pixel need not necessarily be processed together. Furthermore, the processing for a pixel for the various semi-transparent surfaces affecting said pixel can occur in any order, with the same result obtained.

In one embodiment, the pixel may be rendered utilizing at least the selected subset of the samples for each of the semi-transparent surfaces by first identifying for all samples included in all of the selected subsets of samples the color value and the z-value associated therewith. As noted above with respect to operation 104, each of the samples of the pixel included in at least one of the selected subsets of samples stores a color value and a z-value of a front-most semi-transparent surface covered by the sample. Thus, the color value stored by each sample included in at least one of the subsets may be identified. The color values stored for the samples included in at least one of the subsets may then be averaged, and the average utilized as the color value according to which the pixel is rendered. In this way, any samples of the pixel that are not selected for inclusion in at least one of the subsets may not necessarily contribute to the color value according to which the pixel is rendered.

It should be noted that the pixel may be also be associated with any number of non-transparent (opaque) surfaces. Thus, the rendering of the pixel may also be based on such non-transparent surfaces. For example, samples may be selected from the non-transparent surfaces and utilized for rendering the pixel. Such samples may be black, a background color, the color of opaque objects behind the semi-transparent surfaces, etc. Optionally, the samples for the non-transparent surfaces may be rendered separately from the samples for the semi-transparent surfaces. In one embodiment, the samples for the non-transparent surfaces may be rendered first where the samples for the semi-transparent surfaces are culled away using the z-buffer and rendered second, for efficiency purposes.

As described above, primary visibility of an image may be provided utilizing the selected subset of the samples for each of the semi-transparent surfaces. As another option, an off-screen buffer or intermediate image may be calculated utilizing the selected subset of the samples for each of the semi-transparent surfaces. In one embodiment, one sample per pixel of the intermediate image may be generated. For example, a pixel of an intermediate image may be identified, where the intermediate image is utilized to create another image (e.g. final image) for display and an operation may be performed to generate at least one sample for the pixel. Such operation may include any of the operations described above with respect to operation 104. Further, a subset of the at least one sample for each of a plurality of semi-transparent surfaces associated with the pixel may be selected at least in part in a random manner (e.g. as described above with respect to operation 106), and the pixel may be rendered utilizing the selected subset of the samples for each of the semi-transparent surfaces (e.g. as described above with respect to operation 108).

In another embodiment, multiple samples per pixel of the intermediate image may be generated (e.g. as described above with respect to the method 100 of FIG. 1. Just by way of example, the intermediate image may store normal vectors for a deferred shading calculation. A further example of such an intermediate image is a shadow map. For example, a transparent shadow map can be rendered by utilizing a selected subset of the samples generated for a pixel for each semi-transparent surface associated therewith and storing only depth. In one embodiment, one sample per pixel may be generated at a high resolution, where percentage closer filtering may then approximate the transparent shadow map value. In another embodiment, several depths can be stored at each pixel. This can be viewed as a deep shadow map that encodes each ray's visibility function using S depth values $z1; z2; :::zS$. Visibility may optionally be approximated by the equation shown in Table 6.

TABLE 6

$$\text{vis}(z) \approx \text{count}(z \leq z_i) / S$$

To this end, the pixel may be rendered utilizing the selected subset of the samples for each of the semi-transparent surfaces, without necessarily ordering, sorting, etc. the semi-transparent surfaces (thus providing stochastic transparency). In one embodiment, the method 100 may be implemented in hardware [e.g. a graphics processing unit (GPU)], software, or a combination thereof.

Furthermore, utilizing the method 100 described above, the image may be approximated well with any number of semi-transparent layers, and not necessarily when there is only a single semi-transparent layer, while optionally only requiring each surface to be processed once (e.g. by avoiding sorting of the surfaces). Moreover, the method 100 works regardless of whether the semi-transparent layers are all the same opacity, whether the semi-transparent layers are evenly spaced, etc.

In addition, the pixel may be rendered in a single render pass or a low, fixed number of render passes (e.g. three passes for 8 samples per pixel, or five passes for 16 samples) with a fixed memory size. The run time may be substantially stable and linear with the number of semi-transparent surfaces, and it may be unaffected by uneven spatial distribution of semi-transparent surfaces, and responsive to uneven opacities among semi-transparent surfaces (e.g. able without coding for special cases to mix hair, smoke, foliage, windows, and transparent cloth in a single scene). Furthermore, the method 100 may optionally avoid branching at the pixel level and use of read-modify-write loops other than traditional z-buffer blend operations.

It should be noted that various techniques described above may be utilized for reducing noise associated with the rendering of the pixel. For example, the number of samples generated for each of the semi-transparent surfaces may be increased, thereby increasing the number of samples selected as a subset for each of the semi-transparent surfaces from which the pixel is rendered. As another example, stratified sampling may be utilized for reducing noise in which the number of samples included in a subset for each of the semi-transparent surfaces is randomly selected to be as close as possible to the desired opacity level $\alpha$.

Of course, however, other techniques may also be utilized in combination with the aforementioned method 100 for reducing noise. In one exemplary embodiment, alpha correction may be applied to the average of the color values described above. For example, a total opacity level of the semi-transparent surfaces may be used as a correction factor. Further, the total opacity level of the semi-transparent surfaces may be rendered into a separate buffer (e.g. in one pass), which may optionally be multi-sampled.

Table 6 illustrates one example of an equation for determining the total opacity level of the semi-transparent surfaces. Again, it should be noted that the equation shown in Table 6 is set forth for illustrative purposes only and thus should not be construed as limiting in any manner.

TABLE 6

//where $\alpha$ is the opacity level for a semi-transparent surface, and
//i is the semi-transparent surface
$$\alpha_{Total} = 1 - \Pi(1 - \alpha_i)$$

Since the equation shown in Table 6 is independent of the order of the semi-transparent surfaces, it can be evaluated in a single render pass, without sorting. As noted above, the total opacity level of the semi-transparent surfaces (e.g. determined utilizing the equation shown in Table 6) may be used as a correction factor. This correction may be achieved during a subsequent compositing pass, where 1) the opaque background is multiplied by one minus the total opacity level at each sample, and 2) the pixel's average transparent color is multiplied (corrected) by the pixel's average total opacity level divided by the proportion of the pixel's samples contained in at least one of the selected subsets of the pixel's associated semi-transparent surfaces, and 3) the result of (2) is composited over the pixel's average result of (1).

It should be noted that the aforementioned shadow maps may also be alpha corrected by storing the total opacity level per pixel, and filtering it with the same kernel as the percentage closer filter. This may eliminates quantization effects, particularly for shadows thrown onto opaque objects.

In another exemplary embodiment, noise may be reduced by allowing each of the semi-transparent surfaces to contribute to the rendering of the pixel in proportion to its visibility and its level of opacity. Initially, the opaque background is rendered into a multi-sampled z-buffer. Then, in one pass, the total opacity level is rendered into a separate multi-sampled buffer.

Further, in one pass the semi-transparent surfaces are rendered into the opaque z-buffer, discarding samples that are not included in the subsets selected for each of the semi-transparent surfaces, and storing only z. This forms a transparent shadow map from the point of view of the camera. Further yet, in an accumulation pass, the semi-transparent surfaces are rendered and summed into a separate multi-sampled color buffer, weighted by a comparison against the combined z-buffer from the previous operation. In that pass, starting with black, for each fragment of semi-transparent surface i having opacity level $\alpha_i$ and color $c_i$, $\alpha_i c_i$ is added to all samples where $Z_{fragment} \geq Z_{buffer}$. During a subsequent compositing pass, 1) the opaque background is multiplied by one minus the total opacity level at each sample, and 2) the pixel's average accumulated sum is multiplied (corrected) by the pixel's average total opacity level divided by the pixel's average accumulated $\alpha$, and 3) the result of (2) is composited over the pixel's average result of (1). Thus, the contribution of the color of each semi-transparent surface to the total color of the pixel may be determined at least in part by utilizing a semi-transparent shadow map rendered from the point of view of the camera. It should be noted that the first operation described above (i.e. rendering any opaque geometry and the background) may provide an optimization of speed and quality.

As another option to reduce noise, for hardware that is limited in the number of samples for a pixel that are supported, additional samples may be simulated. To simulate more samples, multiple passes using different random values may be averaged together.

As yet another option to reduce noise, more passes may be adaptively rendered for pixels showing larger variance. This may provide a noise level that is uniform and under artist control. As still yet another option to reduce noise, the image may be post processed. For example, a bilateral filter may be used to reduce noise while preserving edges, where to preserve edges from all visible layers of transparency, the transparent image may be cross-filtered with the (non-stochastic) total alpha channel.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 5:
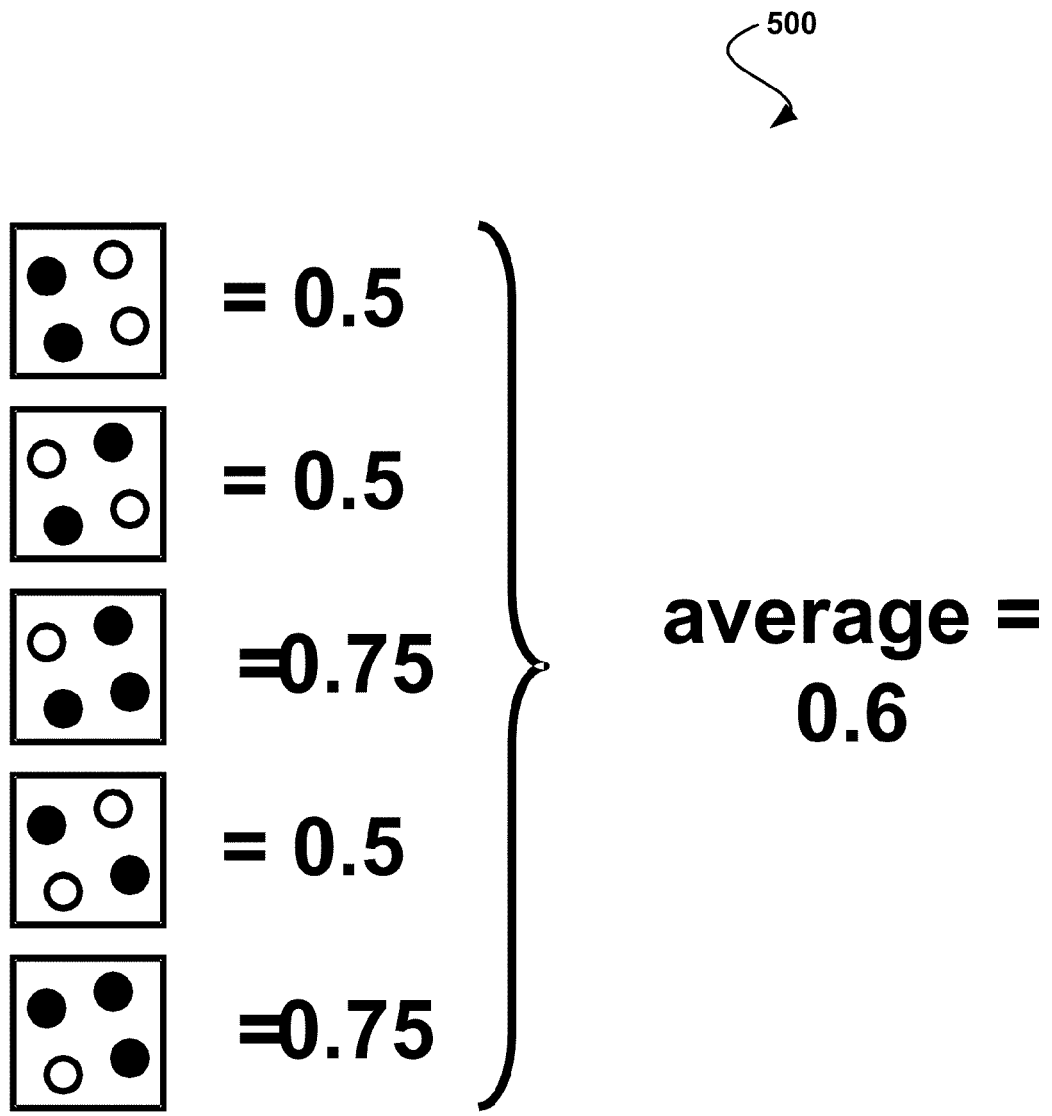
FIG. 5 shows a selected subset of samples for each of a plurality of semi-transparent surfaces, where a number of samples included in at least a portion of the selected subsets is different, in accordance with another embodiment.

FIG. 5 shows a selected subset of samples 500 for each of a plurality of semi-transparent surfaces, where a number of samples included in at least a portion of the selected subsets is different, in accordance with another embodiment. As an option, the selection of the subset of samples 500 may be implemented in the context of FIGS. 1-4. Of course, however, the selection of the subset of samples 500 may be implemented in any desired environment. It should also be noted that the aforementioned definitions may apply during the present description.

As shown, the number of samples included in each subset selected for a different semi-transparent surface varies. In the present embodiment, the number of samples included in each subset varies between two predefined values, i.e. two (50%) and three (75%) samples of the four available samples. The number of samples included the subsets varies in a random manner, such that the average (60%) in the present example matches the opacity level of the semi-transparent surfaces.

Figure 6:
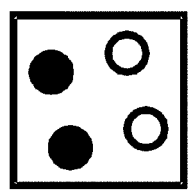
FIG. 6 shows an application of alpha correction, in accordance with yet another embodiment.
Figure 6:
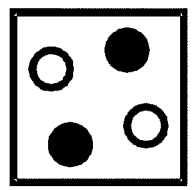
Figure 6:
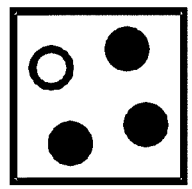
Figure 6:
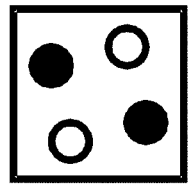
Figure 6:
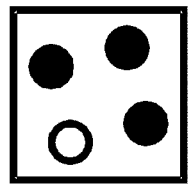

FIG. 6 shows an application of alpha correction 600, in accordance with yet another embodiment. As an option, the application of alpha correction 600 may be implemented in the context of FIGS. 1-5. Of course, however, the application of alpha correction 600 may be implemented in any desired environment. It should also be noted that the aforementioned definitions may apply during the present description.

As shown, with one unordered pass, the correct opacity level can be computed for the pixel. In the present embodiment, such correct opacity level is 0.6. Each pixel is scaled by true_alpha/estimated_alpha, where estimated_alpha is the proportion of samples (R/S) that are covered by at least one of the semi-transparent surfaces.

Figure 7:
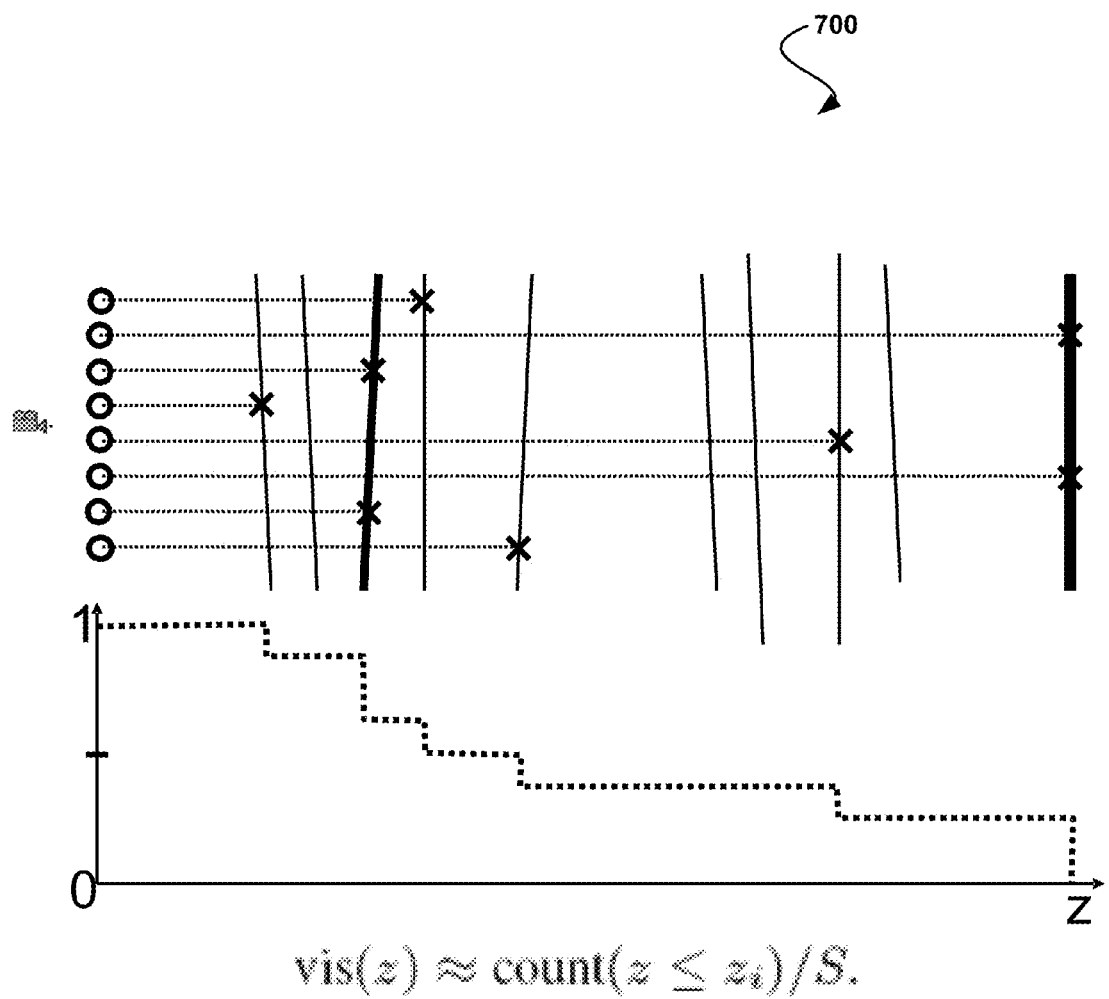
FIG. 7 shows a system for determining a transparent shadow map associated with a pixel, in accordance with still yet another embodiment.

FIG. 7 shows a system 700 for determining a transparent shadow map associated with a pixel, in accordance with still yet another embodiment. As an option, the system 700 may be implemented in the context of FIGS. 1-6. Of course, however, the system 700 may be implemented in any desired environment. It should also be noted that the aforementioned definitions may apply during the present description.

As described above with respect to FIG. 1, each pixel (texel) has S samples. In the present embodiment, the pixel has 8 samples. S comparisons are performed per shadow-texel per lookup. As shown, several depths can be stored at each pixel, one corresponding with each sample, where visibility is approximated by the equation $vis(z) \approx count(z \leq z_i)/S$. For example, the set of depths in a sample mask define a deep shadow function, which is evaluated by counting the samples above/below a given depth.

The deep shadow map may be used to improve the accuracy of alpha used for resolving objects rendered with stochastic transparency. When a deep shadow map is generated from the eye's viewpoint it may allow a computation of the attenuation in front of an object and at the rendering stage the polygon may be rasterized to each pixel with a more accurate transparency than is possible with naive stochastic transparency.

Figure 8:
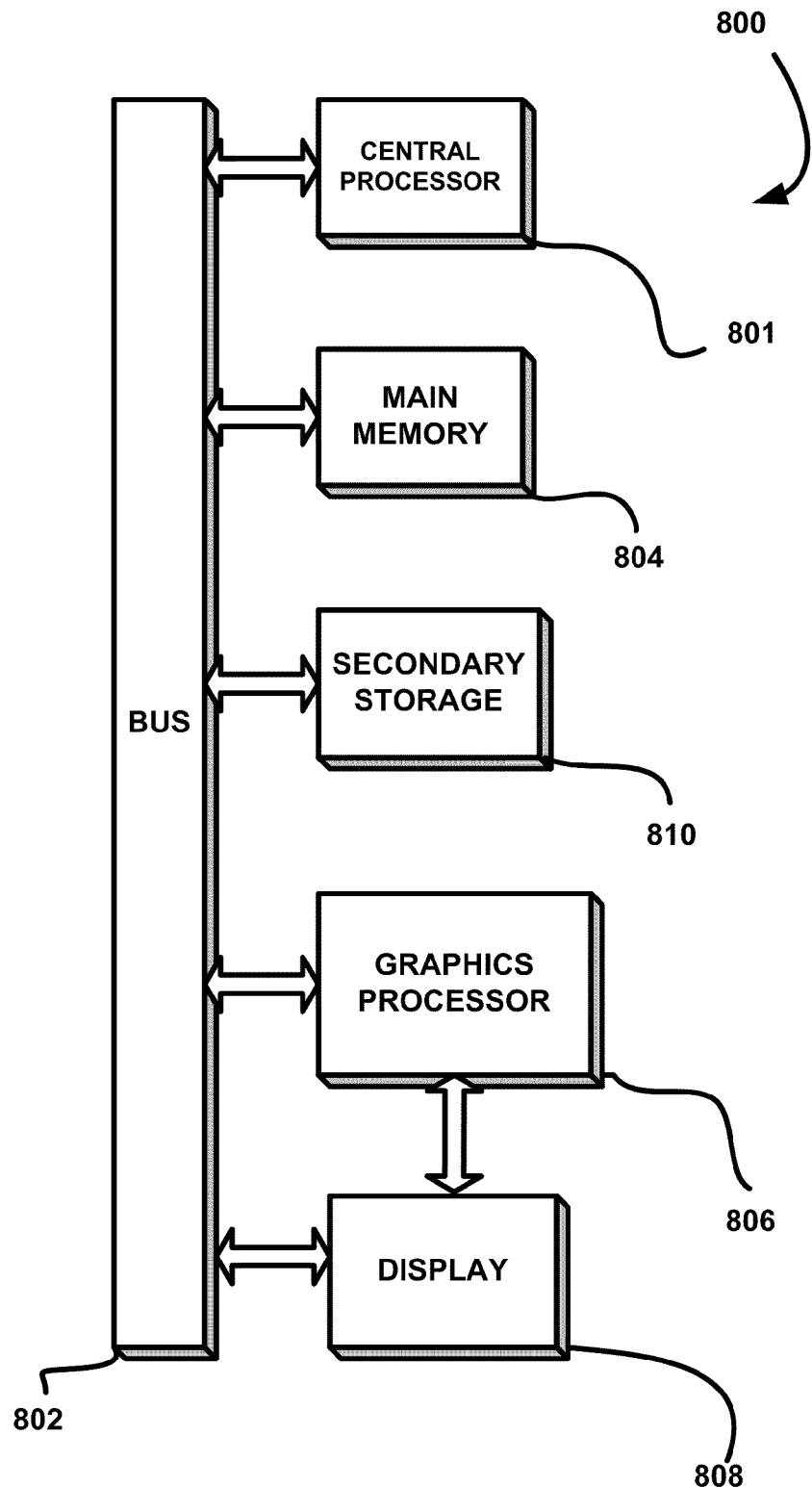
FIG. 8 illustrates an exemplary system in which the various architecture and/or functionality of the various previous embodiments may be implemented.

FIG. 8 illustrates an exemplary system 800 in which the various architecture and/or functionality of the various previous embodiments may be implemented. As shown, a system 800 is provided including at least one host processor 801 which is connected to a communication bus 802. The system 800 also includes a main memory 804. Control logic (software) and data are stored in the main memory 804 which may take the form of random access memory (RAM).

The system 800 also includes a graphics processor 806 and a display 808, i.e. a computer monitor. In one embodiment, the graphics processor 806 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 800 may also include a secondary storage 810. The secondary storage 810 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 804 and/or the secondary storage 810. Such computer programs, when executed, enable the system 800 to perform various functions. Memory 804, storage 810 and/or any other storage are possible examples of computer-readable media.

In one embodiment, the architecture and/or functionality of the various previous figures may be implemented in the context of the host processor 801, graphics processor 806, an integrated circuit (not shown) that is capable of at least a portion of the capabilities of both the host processor 801 and the graphics processor 806, a chipset (i.e. a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 800 may take the form of a desktop computer, lap-top computer, and/or any other type of logic. Still yet, the system 800 may take the form of various other devices m including, but not limited to a personal digital assistant (PDA) device, a mobile phone device, a television, etc.

Further, while not shown, the system 800 may be coupled to a network [e.g. a telecommunications network, local area network (LAN), wireless network, wide area network (WAN) such as the Internet, peer-to-peer network, cable network, etc.) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
    identifying a pixel;
    performing an operation to generate a plurality of samples for the pixel;
    selecting a subset of the samples for each of a plurality of semi-transparent surfaces associated with the pixel at least in part in a random manner, wherein for each semi-transparent surface of the semi-transparent surfaces associated with the pixel, a number of samples in the subset selected for the semi-transparent surface is a function of an opacity value of the semi-transparent surface; and
    rendering the pixel utilizing the selected subset of the samples for each of the semi-transparent surfaces,
    wherein, for each of the subsets of the samples, the number of samples in the subset is randomly selected from a first even opacity value and a second even opacity value, wherein the first even opacity value and the second even opacity value are the closest two opacity values to the opacity value for the semi-transparent surface.

2. The method of claim 1, wherein the samples generated for the pixel each represent a different point on the pixel.

3. The method of claim 2, wherein the operation includes coverage-sample anti-aliasing in which a portion of the samples generated for the pixel refer to the values of another sample.

4. The method of claim 1, wherein at least one region is generated for the pixel, and a plurality of samples is generated for each region.

5. The method of claim 1, wherein the subset of the samples for each of the semi-transparent surfaces is selected in a pseudorandom manner.

6. The method of claim 1, wherein the pixel includes a shadow map pixel, and the rendering includes rendering a depth value to be stored in a shadow map utilizing the selected subset of samples for each of the semi-transparent surfaces.

7. The method of claim 1, wherein for each of the subsets of the samples, the number of samples in the subset of the samples is derived by multiplying the opacity value of the semi-transparent surface for which the subset was selected by a number of the samples generated for the pixel.

8. A computer program product embodied on a non-transitory computer readable medium, comprising:
  computer code for identifying a pixel;
  computer code for performing an operation to generate a plurality of samples for the pixel;
  computer code for selecting a subset of the samples for each of a plurality of semi-transparent surfaces associated with the pixel at least in part in a random manner, wherein for each semi-transparent surface of the semi-transparent surfaces associated with the pixel, a number of samples in the subset selected for the semi-transparent surface is a function of an opacity value of the semi-transparent surface; and
  computer code for rendering the pixel utilizing the selected subset of the samples for each of the semi-transparent surfaces,
  wherein, for each of the subsets of the samples, the number of samples in the subset is randomly selected from a first even opacity value and a second even opacity value, wherein the first even opacity value and the second even opacity value are the closest two opacity values to the opacity value for the semi-transparent surface.

9. An apparatus, comprising:
  a processor for:
    identifying a pixel;
    performing an operation to generate a plurality of samples for the pixel;
    selecting a subset of the samples for each of a plurality of semi-transparent surfaces associated with the pixel at least in part in a random manner, wherein for each semi-transparent surface of the semi-transparent surfaces associated with the pixel, a number of samples in the subset selected for the semi-transparent surface is a function of an opacity value of the semi-transparent surface; and
    rendering the pixel utilizing the selected subset of the samples for each of the semi-transparent surfaces,
    wherein, for each of the subsets of the samples, the number of samples in the subset is randomly selected from a first even opacity value and a second even opacity value, wherein the first even opacity value and the second even opacity value are the closest two opacity values to the opacity value for the semi-transparent surface.

10. The apparatus of claim 9, wherein the processor remains in communication with memory and a display via a bus.

11. A method, comprising:
  identifying a pixel of an intermediate image, the intermediate image utilized to create another image for display;
  performing an operation to generate at least one sample for the pixel;
  selecting a subset of the at least one sample for each of a plurality of semi-transparent surfaces associated with the pixel at least in part in a random manner, wherein for each semi-transparent surface of the semi-transparent surfaces associated with the pixel, a number of samples in the subset selected for the semi-transparent surface is a function of an opacity value of the semi-transparent surface; and
  rendering the pixel utilizing the selected subset of the samples for each of the semi-transparent surfaces,
  wherein, for each of the subsets of the samples, the number of samples in the subset is randomly selected from a first even opacity value and a second even opacity value, wherein the first even opacity value and the second even opacity value are the closest two opacity values to the opacity value for the semi-transparent surface.

* * * * *